United States Patent [19]

Simon et al.

[11] Patent Number: 5,160,853
[45] Date of Patent: Nov. 3, 1992

[54] ELECTRONIC TIMER SWITCH WITH TIME TRACKER

[75] Inventors: Tim Simon, Burlingame, Calif.; Lee Tong, Causeway Bay, Hong Kong

[73] Assignee: Honeywell Inc., Minneapolis, Minn.

[21] Appl. No.: 229,600

[22] Filed: Aug. 8, 1988

[51] Int. Cl.$^5$ .................. H01H 3/26; H01H 43/00; G05B 11/01; H05B 37/02

[52] U.S. Cl. ...................... 307/140; 307/141; 307/116; 364/145; 315/360

[58] Field of Search ............ 307/140, 141, 141.4, 307/141.8, 116, 117; 364/143, 144, 145, 146; 315/360

[56] References Cited

U.S. PATENT DOCUMENTS

| | | | |
|---|---|---|---|
| Re. 31,848 | 3/1985 | Nilssen | 307/140 X |
| 4,213,063 | 7/1980 | Jones, Sr. | 307/140 X |
| 4,293,915 | 10/1981 | Carpenter et al. | 364/145 |
| 4,387,420 | 6/1983 | Singhi et al. | 364/145 |
| 4,570,216 | 2/1986 | Chan | 307/140 X |

OTHER PUBLICATIONS

General Instructions for EC71ST and EC71ST-NE Suntracker TM Electronic Lighting Control, country of printing unknown, with print code Dec. 1987, believed to be Dec. 1987.

Spec Data sheet for "SunTracker TM" Electronic Lighting control for EC71ST and EC72ST Series, printed in the United States, with printing code Sep. 1987 believed to be Sep., 1987.

"A Lighting Controller That Tracks The Sun Automatically," product announcement from Bristol, United Kingdom with dateline Jan. 28, 1986.

"New Products," *Energy User News*, Mar., 1988.

*Primary Examiner*—A. D. Pellinen
*Assistant Examiner*—Sharon D. Logan
*Attorney, Agent, or Firm*—Edward Schwarz

[57] ABSTRACT

A programmable timer for turning a light on and off in response to changing sunset, daylight savings time, and other programmable conditions. The programmable timer includes an input device, a microprocessor, and a switch. The input device provides calendar, geographical, and daylight savings information to the microprocessor, which stores the programming information. The microprocessor computes an effective switching time from the stored information. The microprocessor employs program logic that compares the effective switching time to the current time to generate a timing control signal. The timing control signal, in turn, causes the switch to turn a light on and off. In the preferred embodiment, the microprocessor and the switch are included within a housing which mounts on a wall in place of a normal light switch. A liquid crystal display is disposed on a face of the housing to provide a read out of the programming information and of the time of day. The input device is disposed on the face of the housing and includes a key matrix having a plurality of finger settable key type programming switches. Information is programmed by depressing each key while the programming logic is in a particular program mode.

9 Claims, 5 Drawing Sheets

1. LATITUDE  (82)

2. MONTH  (84)

3. DAYLIGHT/STANDARD    (86)   (88)
"DAYLT" OR "STD"

4. CLOCK  (90)

5. PROGRAM    (92)
NUMBERS "1" TO "8"

6. TIME TRACKER  (94)

ELECTRONIC TIMER SWITCH WITH TIME TRACKER

This invention relates generally to an automatic light switch and in particular relates to a programmable timer for turning a light on and off using stored geographical, calendar, and daylight savings information.

BACKGROUND OF THE INVENTION

Many automatic lighting devices are known which provide a number of benefits and conveniences. However, these devices suffer from a variety of limitations.

For example, U.S. Pat. No. 4,198,574 discloses a timing control circuit which turns a light on and off over time to give a dwelling the appearance of occupancy. However, this device must be set on a day-to-day basis. Further, the device is responsive to mechanical settings and thus has limited on and off patterns. In addition, the device requires a photocell input to turn on under low light conditions.

U.S. Pat. No. 4,349,748 discloses a timer and power control system which responds to successive advancement of a rotatable control dial. This system is also limited because it is essentially a mechanically controlled system.

U.S. Pat. No. 3,739,226 discloses an emergency light circuit for mounting to an electrical wall outlet. This device replaces a wall switch and uses rechargeable batteries to energize a light when the main power fails or the ambient light intensity falls below a predetermined level. This device is also photocell responsive.

Thus, it can be seen that known automatic devices suffer from several disadvantages. First, these devices have previously been responsive to essentially mechanical settings and thus have been relatively limited in the number of on/off patterns available. In particular, these devices have had a limited variety of on/off settings available during the day and have had even less flexibility in varying their on/off patterns from day-to-day.

In addition, these devices have required photocell inputs for responding to changing light levels. However photocell arrangements increase the cost and complexity of the lighting control system, must sometimes be located remote from the rest of the switching system itself, and do not add a high degree of flexibility or turn on/turn off accuracy in response to changing time.

Moreover, these systems have not been capable of automatically adjusting to varying light conditions caused by sunset variations based on geographical location, the advancing days of the year, or daylight savings time changes.

SUMMARY OF THE INVENTION

The invention provides a programmable timer for turning a light on and off in response to changing sunset, daylight savings time, and other programmable conditions. The programmable timer includes an input device, a microprocessor, and a switch.

The input device provides programming information to the microprocessor which stores the programming information. The microprocessor computes an effective switching time from the stored information. The microprocessor employs program logic that compares the effective switching time to the current time to generate a timing control signal. The timing control signal, in turn, causes the switch to turn a light on and off.

In one embodiment, the microprocessor and the switch are included within a housing which mounts on a wall in place of a normal light switch. A liquid crystal display is disposed on a face of the housing to provide a read out of programming information and of the time of day. The input device is disposed on the face of the housing and includes a key matrix having a plurality of finger settable key type programming switches. Information is programmed by depressing each key while the programming logic is in a particular programming mode. The input device and the liquid crystal display may be recessed into the face of the housing.

The above and other objects, aspects, features and advantages of the invention will become more readily apparent from the following description of the embodiments, when considered with the accompanying drawings and appended claims.

DETAILED DESCRIPTION OF THE INVENTION

The invention provides a programmable electronic timer which may be used to provide a timing signal for a variety of applications, such as controlling power to a light or other electrical load. The invention is self contained, that is, it does not require a photocell or some other external apparatus to respond to varying sunset conditions. The timer may be set to turn on and off as often as desired over the course of the day. In the preferred embodiment, the timer is included in a programmable light switching device for turning a light on and off in a variable, automatic, and precise manner over time.

The electronic timer of the invention may be substituted for a normal light switch and mounted directly on a wall. The timer will turn a light on and off automatically a number of times during the day depending on stored programming information. The programmable timer also includes a manual on/off switch and a liquid crystal display which functions as a program read out and as a clock.

The invention is programmed by depressing button-like programming keys which set mode, program, hour, minute, standard time, time tracker, and reset conditions. The programmable switch also comes with a rechargeable battery which permits programming before installation. The rechargeable battery also powers the programmable timer during power outages. The programmable timer may be mounted to a wall with a hidden screw at a lower control surface.

Figures 1A, 1B:
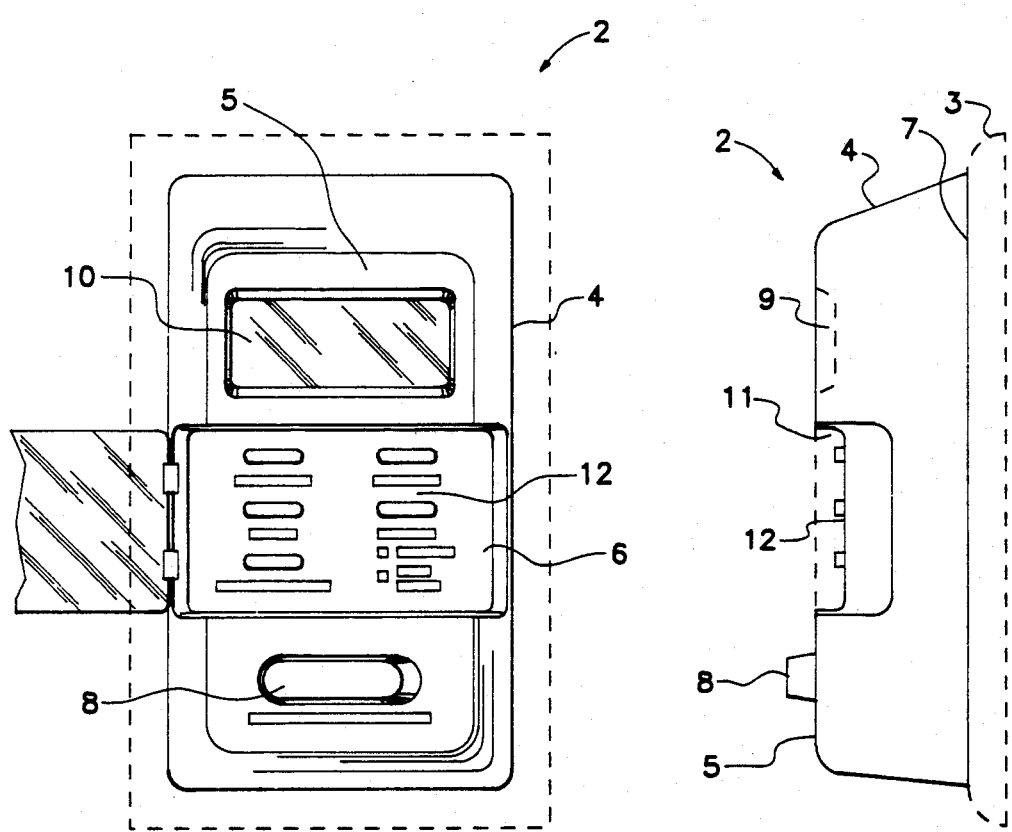
FIG. 1A is a front view of a programmable light switching apparatus according to the invention.
FIG. 1B is a side view of a programmable light switching apparatus according to the invention.

Refer now to FIG. 1A, FIG. 1A is a front view of a programmable electronic timer according to one embodiment of the invention. As shown in FIG. 1A, the timer 2 includes a housing 4. The housing 4 has a face 5 on which is mounted several other components of the timer including a programmable input device 6, a display 10 and a manual switch 8. In the preferred embodiment, the programmable input device 6 consists of a plurality of depressible key type switches, referred to hereafter as a key matrix.

The display 10 is a liquid crystal display in the preferred embodiment. The manual switch 8 is a three position slidable switch having an on, off, and auto setting.

FIG. 1B is a side view of the programmable electronic timer according to the invention. The programmable timer 2 is shown mounted on a wall 3. The timer 2 includes a housing 4 which has a back section 7 configured to mount flush on wall 3 in place of a standard light switch.

The display 10 is situated in a display recess area 9 and a key matrix 12 is situated in a programming recess area 11. Switch 8 is slidable and is shown protruding slightly from the face 5 of housing 4.

Figure 2:
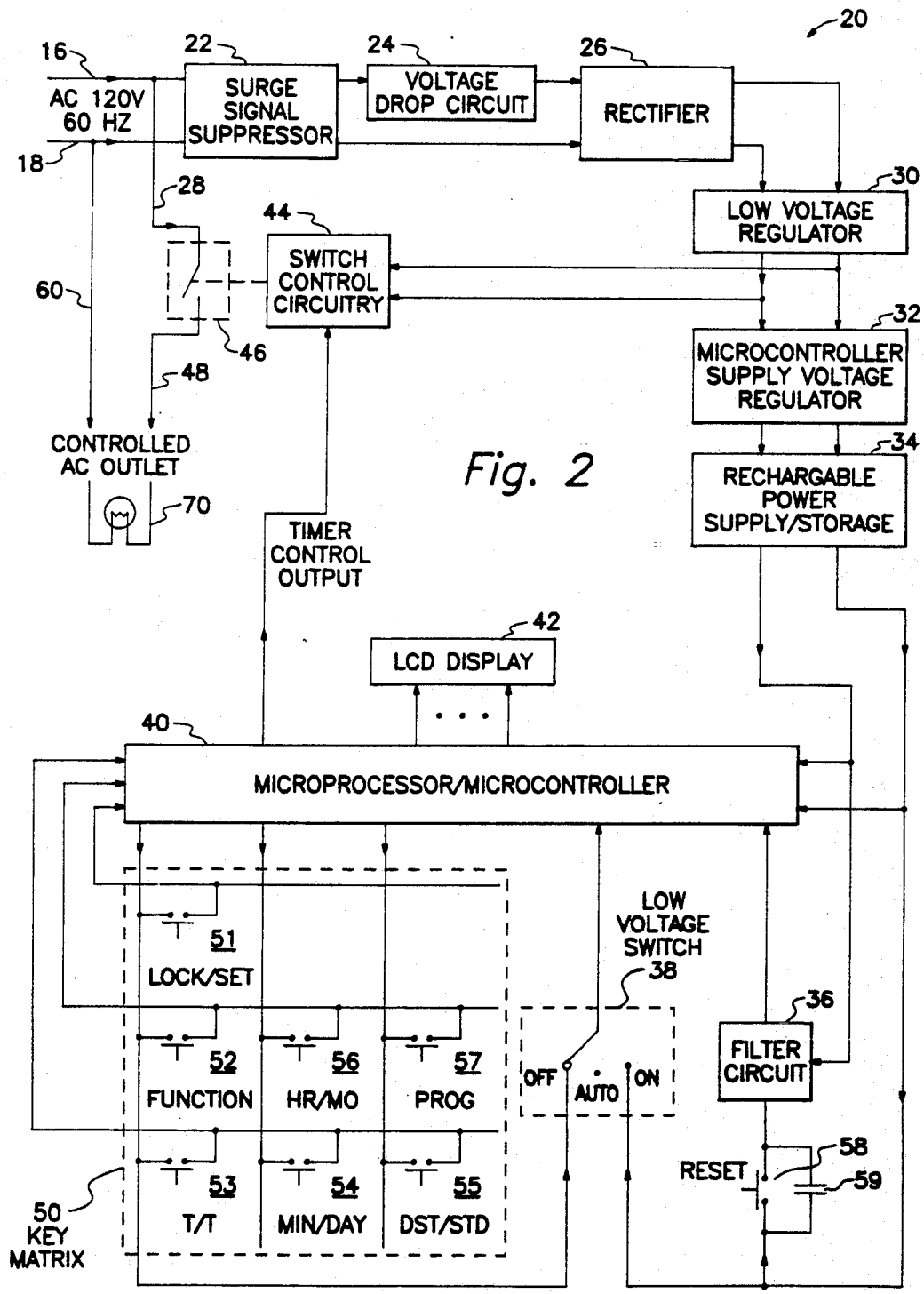
FIG. 2 is a diagram of circuits included in a programmable light switching apparatus according to the invention.

Housing 4 contains control and switching circuits, referred to hereafter collectively as a timer control circuit. One embodiment of a timer control circuit according to the invention is shown in FIG. 2. The timer control circuit 20 in FIG. 2 receives 120 volt AC power and outputs 120 volt AC power on a controlled basis.

As a brief overview of the structure and operation of circuit 20, it is noted that the circuit 20 includes voltage control circuitry, a microprocessor, a programmable input device and related circuitry, and a switching circuit.

The microprocessor and programming circuits are used to selectively control the switching circuit. The programmable input device provides time, geographic, daylight savings, mode, and other programming control information to the microprocessor.

The microprocessor provides a timer control output signal to the switch control circuitry to turn a switch on and off, depending on the programming information stored in the microprocessor. Thus, the circuit 20 turns a light on and off according to desired lighting objectives.

Discussing FIG. 2 in more detail, it can be seen that a 120 volt AC input having lines 16 and 18 is coupled to a surge signal suppressor circuit 22. Line 16 is tapped and coupled directly by line 28 to an input side of switch 46. An output side of switch 46 is coupled by line 48 to a light 70. A line 60 is coupled from line 18 and is also connected directly to light 70.

Switch 46 is selectively turned on and off by a switch control circuit 44. Switch control circuit 44 is in turn controlled by a timer control output from microprocessor 40. Microprocessor 40 is controlled by programming inputs from key matrix 50 and by its programming logic.

Both switch control circuit 44 and microprocessor 40 will normally require regulated voltage inputs. Thus, voltage control circuitry is included between the 120 volt AC input and inputs to switch control circuit 44 and microprocessor 40. Accordingly, input lines 16 and 18 are initially connected to a surge signal suppressor 22. One output line from surge signal suppressor 22 is coupled through a voltage drop circuit 24 to a rectifier circuit 26. A second output line from suppressor 22 is coupled directly to rectifier 26.

Rectifier circuit 26 converts the AC input to DC. The output of rectifier 26 is coupled to a low voltage regulator 30.

Low voltage regulator 30 maintains the DC voltage at a constant voltage. One power output of low voltage regulator 30 is coupled to an input to switch control circuit 44 to provide power for operating switch control circuit 44.

Another power output of low voltage regulator 30 is provided to additional circuitry which further regulates the voltage before it is provided to microprocessor 40. A second power output from low voltage regulator 30 is provided to micro controller supply voltage regulator 32. Micro controller supply voltage regulator 32 operates to maintain the input voltage to microprocessor 40 within a very narrow range. An output of micro controller supply voltage regulator 32 is coupled to a rechargeable power supply storage device 34. This rechargeable supply may be, for example, a battery.

A first line output of rechargeable power supply 34 is coupled to an input to microprocessor 40 and to an input to a filter circuit 36. A second line output from rechargeable power supply 34 is connected to an input to reset switch 58 and to an input to a low voltage switch 38.

Microprocessor 40 is controlled by programming inputs from key matrix 50, low voltage switch 38, and the reset switch 58. Micro processor 40 includes a memory (not shown). It should be understood that the reset switch 58 may be physically located with the other switches in key matrix 50.

The key matrix 50 includes a plurality of finger settable programming switches. In one embodiment of the invention each switch consists of a dome type button which completes an electrical circuit when depressed. An input side of each switch is coupled to an output from microprocessor 40 and an output side of each switch is coupled to an input to microprocessor 40. Thus, microprocessor 40 senses a complete circuit (i.e., a voltage change) when a particular key is depressed.

Low voltage switch 38 corresponds to the three position slidable switch 8 from FIG. 1 and has "on", "off", and "auto" switches. These switches consist of two sided switch contacts. The on contact has one side connected to the second output line from the rechargeable power supply device 34. The "auto" contact has one side in a floating position. The "off" contact has one side coupled to an input lock set key, a function key and a time tracker key of key matrix 50.

The second sides of the "off", "on", and "reset" contacts are coupled to corresponding inputs of microprocessor 40 when the switch is slid into either the "on", "off", or "reset" position. The second contact is floating when the switch is not slid into that position. The slidable switch 38 is in one of the three positions at all times.

Reset key 58 has one side which receives power over the second power line output from rechargeable power supply 34. Reset switch 58 is bypassed by a capacitor 59. The second side of the reset key is coupled to a filter circuit 36.

Filter circuit 36 also receives the first power line output from rechargeable power supply device 34. The output of filter circuit 36 is coupled to an input of microprocessor 40.

A liquid crystal display device 42 which corresponds to the display 10 in FIG. 1A is coupled to outputs to microprocessor 40.

Microprocessor 40 also has an output that provides a timer control signal to the switch control circuit 44. This time control signal causes the switch control circuit 44 to open or close switch 46 to selectively provide power to a receiving light or other load.

The timer control circuit 20 is responsive to a key matrix 50, which corresponds to the programmable input device 6 of FIG. 1A. Key matrix 50 includes a number of programming keys according to the invention. Key matrix 50 includes a lock/set key 51, a function key 52, a time tracker key 53, a minute/day key 54, a daylight saving time/standard time key 55, an hour/month key 56, a programming/zone key 57 and a reset key 58. Each key provides two programming modes, depending on whether or not it is depressed.

Lock/set key 51 enables and disables the other programming keys in the key matrix.

The function key 52 is used to sequentially move the timer through the various programming modes.

The time tracker key 53 allows programming of a sunset time tracking function.

The minute/day key 54 is used to program the minute and day.

The daylight savings time/standard time key 55 is used to program savings time conditions and adds or subtracts one hour to the current time to correspond to daylight savings or standard time.

The hour/month key 56 is used for programming the hour and the month.

The programming key 57 is used to program the times for which the light is to come on and off during the day. The programming key, in one embodiment, can operate to provide up to eight on/off settings (four on; four off).

Reset key 58 is used to clear the programs previously stored in memory.

The operation of the key matrix 50 and the microprocessor 40 according to the invention will now be described by reference to the logic flow diagrams depicted in FIGS. 3 and 4.

Figure 3:
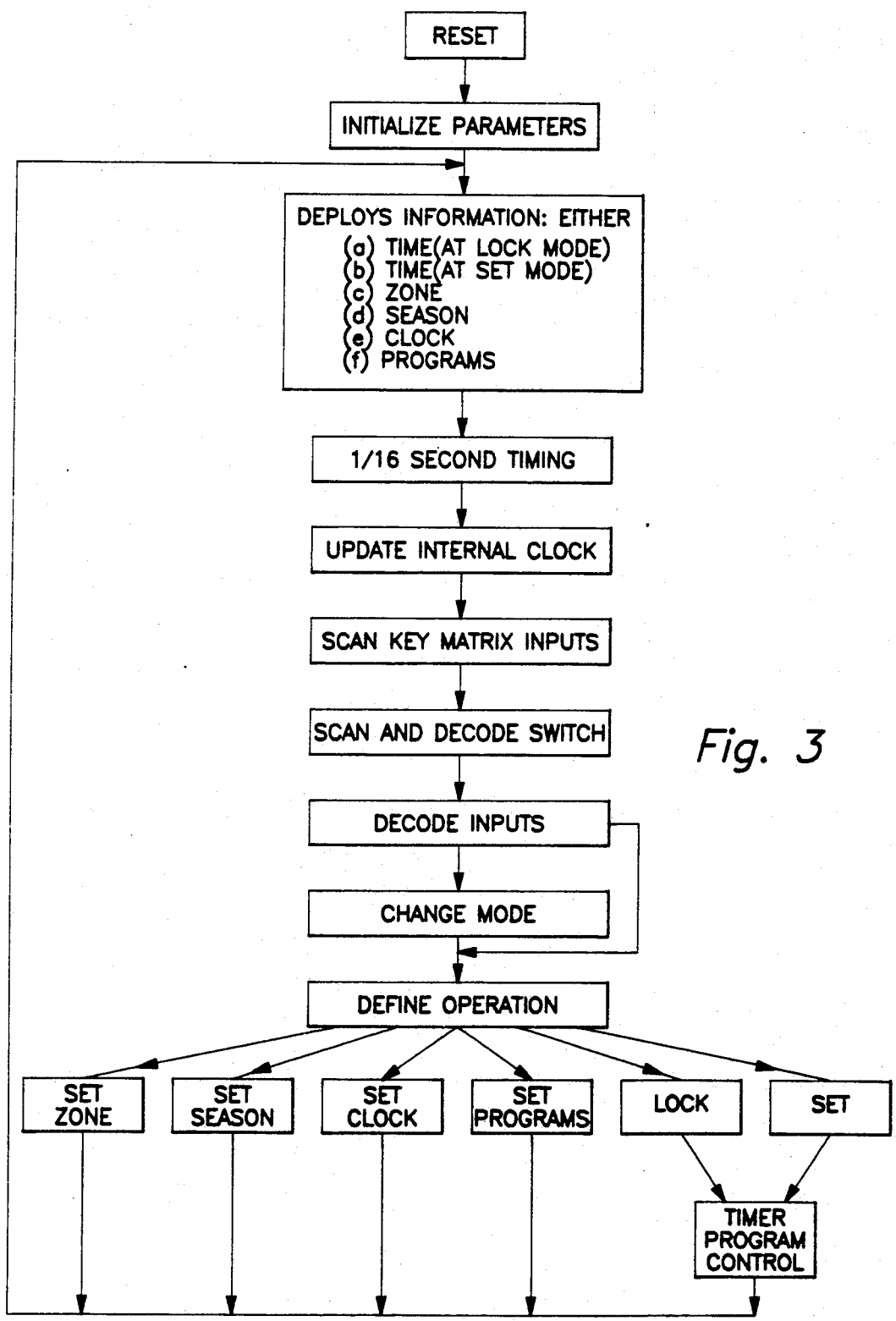
FIG. 3 is a logic diagram of the program used by the microprocessor according to the invention.

Refer now to FIG. 3 which is a logic flow diagram of the programming logic which controls the interactive operation between the microprocessor and the programming keys in the key matrix.

To initiate operation of the programmable apparatus, the microprocessor is reset by depressing the reset key. This resetting initializes certain parameters used in the programming functions as will be mentioned in more detail hereafter.

First, the microprocessor sets a number of programs and clears their contents. The microprocessor also initializes the timer control output signal to off. The microprocessor also initiates the program control for a new calendar day. In general, this initial step resets all the relevant parameters for processing.

After all parameters are initialized, the program logic causes information stored in memory in the microprocessor to be displayed.

The invention operates in either of two basic modes: a programming mode ("set") or a non-programming mode ("lock"). Since the apparatus is not being programmed immediately after initialization, the lock mode. i.e., a time indication, is initially displayed. The display will show the time reading and the daylight savings/standard time indicator. Daylight savings time is shown as "DST". The standard time is shown as "STD". In the lock mode, the entire display is non-moving except when the clock changes time reading. The hours and minutes are separated by a colon. In the lock mode, only the reset and lock/set buttons function. The timer will remain in the lock mode until the lock/set key is depressed, which places the timer in the set mode.

The microprocessor causes the time and set mode to be displayed when placed in the set mode. The display shows the same information as for lock mode, except that the time reading flashes. In this mode, the daylight savings time and standard time setting may be modified. The clock setting will respond to any change by adding or subtracting one hour to or from the current time to correspond to the change to or from daylight savings time and to or from standard time.

The timer may now be circulated from the set mode through various programming modes in the following pattern: set, zone, season, clock, program, set. The programming modes are advanced by successively depressing the function key. Each mode is characterized by a display. During each mode, a programming condition may be set.

Thus, after the set mode, the microprocessor will cause the current zone to be displayed. The display will show the current zone setting which indicates, when time tracking is enabled, the rate of time tracking that will be performed. A U.S. map symbol appears in the display to indicate this mode of operation.

Next, the microprocessor causes a season indication to be displayed. This display appears as a simplified calendar along with the current time (daylight savings or standard).

Next, the microprocessor causes a clock indication to be displayed. The clock display shows the current time reading and a clock symbol to indicate that the timer is in the set clock mode.

Next, the microprocessor causes a program mode symbol to be displayed. The display will appear as a P symbol, a program number and the switching on/off setting corresponding to that program number. The P symbol indicates that the timer is in the program mode and can be programmed for time tracking. The time tracking symbol also will appear if the program is enabled for sunset time tracking. The programming settings may be reviewed one at a time by pressing the program button.

Each of the foregoing modes may be set during the time that each is being displayed. This is accomplished by putting the lock/set button in the set mode (i.e., by depressing the lock/set key) and by pressing the function key button to circulate the timer through the foregoing modes. The function key button will move the timer to the next operation mode according to the following sequence: set, set zone, set season, set clock, set programs.

The zone may be set as follows. The geographic zone number may be advanced by pressing the program button. If the zone number is already at the maximum, further advance will take the zone number back to the minimum. The zone indicates the rate at which time tracking will be performed.

The season may be set by pressing the hour/month and minute/day buttons, respectively. Continuously pressing the corresponding button for more than a short period will activate fast advance features. The daylight savings time/standard time setting may be changed by pressing the daylight savings time/standard time button. The internal clock will respond to the daylight savings time/standard time change by adding or subtracting one hour to or from the current time.

The clock may be set as follows. The internal hour and minute settings may be advanced independently by pressing the hour/month, minute/day buttons, respectively.

The programs may be set as follows. The hour and minute settings for a displayed program may be advanced independently by pressing the hour/month and minute/day buttons, respectively. The time tracking function for each program may be enabled or disabled by pressing the time tracking button. When the time tracking function is enabled for a program, the current calendar day is remembered for time tracking purposes. Pressing the program button will advance the program memory number. By pressing the program button without modifying the settings, all program settings may be reviewed, one at a time.

Once the information has been displayed and the modes have been set, the program logic halts and proceeds through a 1/16th second timing loop. At the conclusion of the 1/16th second loop, the internal clock will be updated.

Next, the key matrix inputs are scanned to determine which buttons have been depressed. Next, the three position input circuit is scanned and decoded to detect which position the three position switch is in. This scanning is done more than once to eliminate ambiguity arising from switching during scanning.

Next, the microprocessor decodes all the inputs. Having determined which of the key matrix switches have been pressed, and the position of the slide switch, the microprocessor determines the operation mode and the processing required to be performed.

Next, the microprocessor determines whether or not a mode change is required. If the timer is previously in a lock mode, then pressing the lock/set button will move the timer to the set operation mode and other buttons will be ignored unless the function key is thereafter depressed.

If the timer was previously not in the lock mode (i.e., was in the set mode), then pressing the lock/set button will move the timer to the lock operation mode.

Pressing the function key button while in the set mode will move the timer to the next operation mode, as determined by the following circular sequence: set, set zone, set season, set clock, set programs, set.

When no button has been activated for a predetermined period, the timer will automatically move to the lock operation mode.

The program logic next defines its mode of operation. It is noted that the timer can be in only one of the following operation modes: lock, set, set zone, set season, set clock and set programs. The microprocessor/microcontroller determines from its memory which mode the timer is in and performs the corresponding operation.

If the programmable timer is in the set zone, set season, set clock or set programs mode, any programming changes will be made to the memory and the microprocessor logic will return to the display information mode. If the set switch is not depressed again, the microprocessor logic will automatically revert to the lock mode, causing only the time to be displayed. In the lock mode, the timer will function virtually as a clock.

Figure 4:
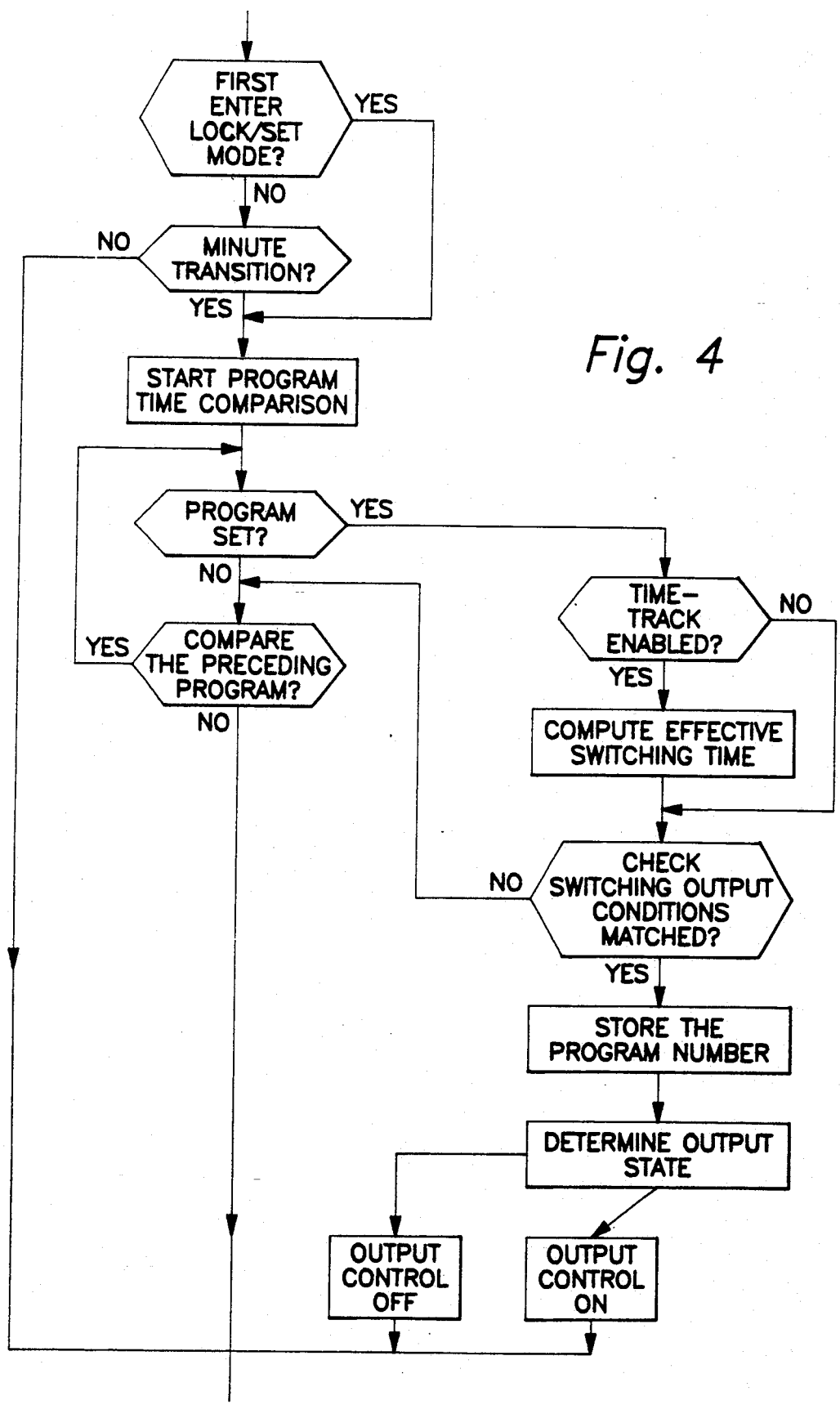
FIG. 4 is a logic diagram of the timer control program for generating a timing control signal according to the invention.

If the microprocessor determines that it is in a lock or a set mode, the microprocessor conducts timer control logic, as set forth in FIG. 4.

In the timer control logic, first the microprocessor checks to determine if transition to lock or set mode just occurred. If the answer is yes, the program immediately starts program time comparison.

If the transition to lock or set mode did not just occur, then the program logic determines whether or not a minute transition has occurred. If no minute transition occurred, the program logic exits the timer control program and returns to the lock mode.

In the event a minute transition has occurred, the timer control logic will then initiate program time comparison.

At the start of program time comparison, a program set inquiry is made in which the microprocessor will check the current clock setting against the stored program times, starting with the last program setting.

The program logic determines if the current program has a switch time setting entered.

If the answer is no, the program logic will compare the "preceding program". The "preceding program" is compared using a logic routine which defines the program which last made a switching output as the "last program matched". The program logic then checks and determines if the program time comparisons have been performed against the clock for all programs after the last program matched. If all such program time comparisons have been completed, then no further program control is made and the programming logic exits back to the lock mode. If the process is not completed, the programming logic moves to the preceding program and reinitiates the program set step. When no preceding programs exist, the logic exits to the lock mode.

If the current program has a switch time setting entered, the programming logic next determines if the time track key is enabled for the current program setting. If so, then the program logic computes the effective switching time. If not, the computation of the effective switching time routine is bypassed.

The effective switching time is computed by adding the effective time offset to the stored program switch time. The effective time offset is computed with the stored calendar date on which the time track function was enabled, the current calendar date, and the time offset for each month and day between these two calendar dates.

Starting from the stored calendar date, the effective switching time at the beginning of next month is computed by adding time offset for the rest of the month. This time offset is the product of the daily offset time of the month and the number of days left in the month. The offset time of each month is added to the effective switching time until the current calendar month is reached.

The final effective switching time is obtained by adding the time offset for the current calendar month. This time offset is the product of the daily offset time of the month, and the number of days after the first day of the month.

After computation of the effective switching time, the effective switching time is then matched against the current clock. If the current effective switching time matches the current clock, then the timer control output signal is provided. If the two times do not match, the program logic returns to the step of comparing the preceding program.

If the effective switching time matches the current clock, the program logic stores the program number for the matched program. This program number is stored as the last program matched. This information is used to eliminate further program time comparison with the previous switching times of the day. The program memory is cleared when a fresh, new day begins.

Next, the program logic determines the output state. If the program number is odd, then the switching output signal provided is "on". Otherwise, it is "off". If the output control signal is on, a timer control output signal is provided to cause switch control circuit 44 to close switch 46, thereby providing power to the target light.

If the output control signal is off, then no switch control signal is provided to circuit 44, which is thereby is inactivated. As a result, switch 46 will be placed in the open condition and thereby no power will be provided to the target light.

Figure 5:
FIG. 5 shows pictorial illustrations displayed to represent the various programming modes.
Figure 5:
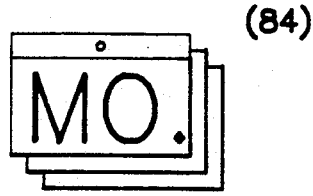
Figure 5:
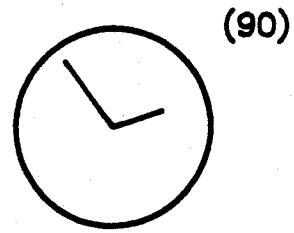
Figure 5:
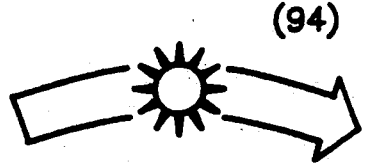

Refer now to FIG. 5, FIG. 5 depicts symbols displayed according to one embodiment of the invention to represent the latitude (zone), month (calendar), daylight/standard, clock, program, and time tracker modes. The symbols are pictorial and may be configured to suggest the programming function.

It should be evident that the above circuits, keys, pictorial displays, and programming logic are merely illustrative and that various modifications and changes may be made thereto without departing from the spirit and scope of the invention, as set forth in the appended claims. Other changes and modifications of the disclosed embodiments will be readily apparent to those skilled in the art. For example, the on and off times may be programmed to recur more often than every day, or longer than every day. The timing control signal may be used to control an alarm or another load rather than to turn a light on or off. The timer may be included in a watch or pager or similar portable device or control another appliance or trigger some other function based on deriving the effective switching time from stored geographical, calendar, and daylight savings information.

It is therefore the Applicant s intention to cover by the claims all those changes and modifications which could be made to the embodiments to the invention, without departing from the spirit and scope of the invention as set forth in the appended claims.

What is claimed is:

1. A programmable switching apparatus for controllably illuminating a light from a power supply, comprising:
    input device means for providing programming information, said programming information including geographical information comprising a graphical representation of a geographic area divided into a plurality of zones;
    a microprocessor for storing said programming information, for computing an effective switching time responsive to said stored programming information and for comparing said effective switching time to a current time to generate a timing control signal; and
    a switch, responsive to said timing control signal, for receiving input power from the power supply and for coupling said input power to the light.

2. The programmable switching apparatus of claim 1 wherein said input device means further comprises means for providing said geographical information by selecting a particular one of said plurality of zones.

3. The programmable switching apparatus of claim 1 wherein said represented geographical area consists essentially of the continental United States and said plurality of zones includes three zones dividing said continental United States into a northern portion, a middle portion and a southern portion.

4. The apparatus of claim 1, wherein the means for providing programming information further comprises means for providing geographical information comprising a geographical representation of a geographical area divided by lines of latitude into a plurality of zones.

5. The apparatus of claim 1, wherein the means for providing programming information further comprises means for providing geographical information comprising a geographical representation of a geographical area divided by lines of latitude into a plurality of contiguous zones.

6. A method for controlling a switching of an illumination means, comprising the steps of:
    providing a switching apparatus for controlling a power supply coupled to the illumination means in response to a timing control signal;
    providing an input device coupled to a microprocessor;
    displaying on the input device a representative of a geographical area divided into a plurality of zones;
    selecting said geographical information by use of said representation on the input device;
    inputting programming information to said microprocessor from said input device;
    calculating an effective switching time from said programming information; and
    generating said timing control signal by comparing a current time to said effective switching time.

7. The controlling method of claim 6 wherein said geographical area represented consists essentially of the continental United States, and said plurality of zones divide said continental United States into a northern zone, a middle zone and a southern zone.

8. The method of claim 6, wherein the displaying step comprising the step of displaying a representation of a geographical area divided by lines of latitude into a plurality of zones.

9. The method of claim 6, wherein the displaying step comprising the step of displaying a representation of a geographical area divided by lines of latitude into a plurality of contiguous zones.

* * * * *